United States Patent [19]

Rahrig et al.

[11] Patent Number: 4,973,344
[45] Date of Patent: Nov. 27, 1990

[54] METHOD AND APPARATUS FOR BENDING GLASS SHEETS

[75] Inventors: Donald D. Rahrig, Toledo, Ohio; Floyd T. Hagedorn, Sherman, Tex.

[73] Assignee: Libbey-Owens-Ford Co., Toledo, Ohio

[21] Appl. No.: 413,854

[22] Filed: Sep. 28, 1989

[51] Int. Cl.⁵ ............................................. C03B 23/02
[52] U.S. Cl. ........................................ 65/288; 65/106; 65/290; 65/351
[58] Field of Search .................. 65/104, 106, 115, 351, 65/361, 288–291

[56] References Cited

U.S. PATENT DOCUMENTS

| | | | |
|---|---|---|---|
| 4,305,746 | 12/1981 | Hagedorn et al. | 65/106 |
| 4,396,410 | 8/1983 | Hagedorn et al. | 65/106 |
| 4,496,386 | 1/1985 | Hymore et al. | 65/106 |
| 4,501,603 | 2/1985 | Frank et al. | 65/106 |
| 4,746,348 | 5/1988 | Frank et al. | 65/104 |
| 4,802,903 | 2/1989 | Kuster et al. | 65/106 |

Primary Examiner—Robert L. Lindsay
Attorney, Agent, or Firm—Marshall & Melhorn

[57] ABSTRACT

The invention is directed to the press bending of individual heated glass sheets to be subsequently laminated in pairs to a plastic interlayer. The sheets are individually press bent between a female ring-type shaping rail and a continuous male mold surface having complemental shaping surfaces. In order to provide different pressure patterns for bending the two sheets of each pair, the male mold member comprises outer shaping rails supported in spaced relation upon a base plate. A separate flexible shaping member or pad is disposed in the space between the outer shaping rails to define the continuous shaping surface and is mounted in spaced relation upon a support plate. The support plate is affixed to the base plate by means of eccentrically mounted rotatable shafts. Articulating means is provided for cycling the shafts between alternate rotary positions to vary the position of the flexible pad member relative to the outer shaping rails and thereby to apply a different pressure pattern for bending each of the sheets of a pair.

16 Claims, 4 Drawing Sheets

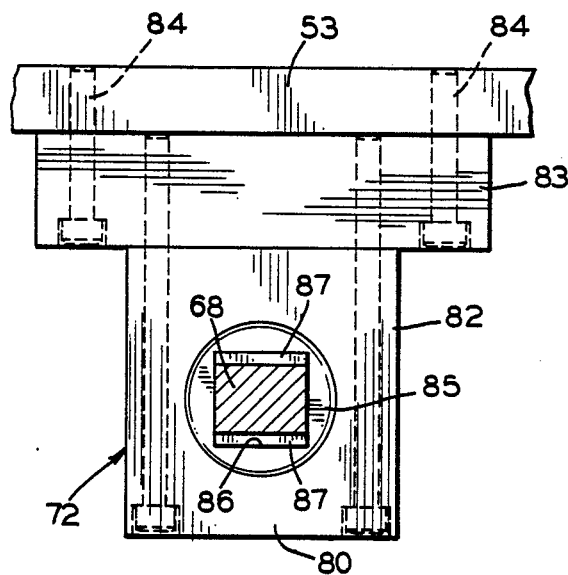
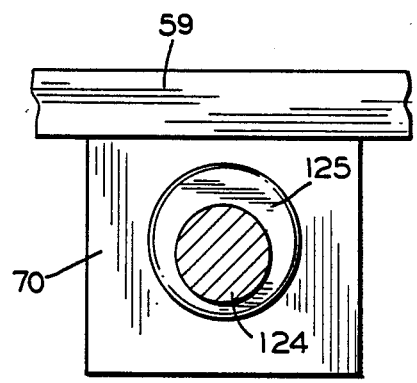
FIG. 6
FIG. 7
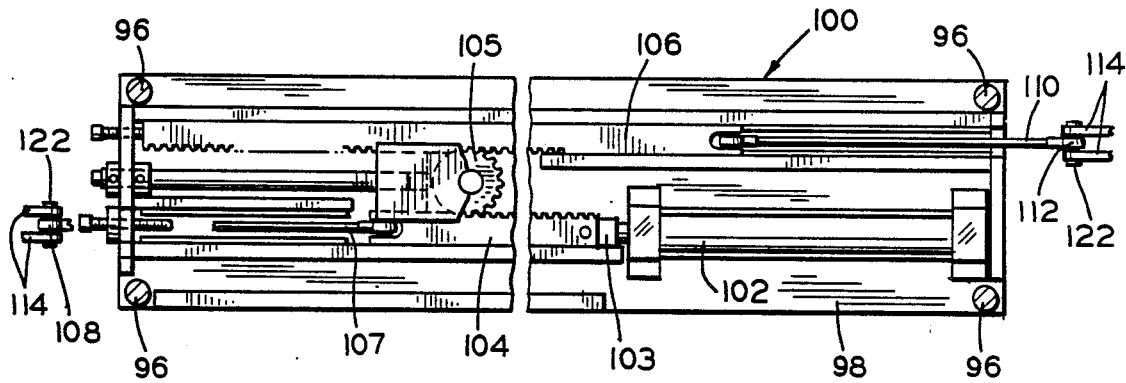
FIG. 8
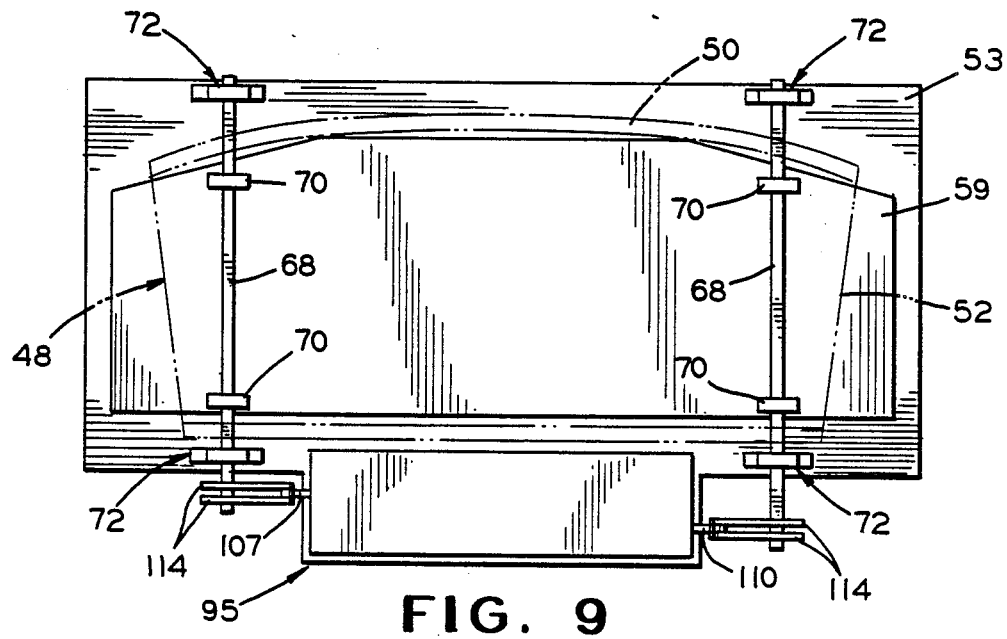
FIG. 9

METHOD AND APPARATUS FOR BENDING GLASS SHEETS

BACKGROUND OF THE INVENTION

1. Field of the Invention

The present invention relates generally to the production of bent or curved glass sheets, and more particularly to an articulated male press bending member embodying means for shifting the configuration of selected portions of its shaping surface between alternate positions.

2. Description of the Prior Art

Bent or curved sheets of glass are commonly employed as glazing closures in automotive vehicles. In order to conform to the styling of the vehicle and to properly fit within a designated opening within the vehicle body, it is necessary that the glass sheets must be bent to precisely defined curvatures. It is also necessary in order to comply with stringent Federal standards and to be aesthetically acceptable, that the bent sheets be relatively free of optical defects that might tend to interfere with vision therethrough. In accordance with Federal standards, such bent automotive glass is generally of two types, that is, tempered monolithic units acceptable for use as side lights and backlights, and laminated units required for use as windshields.

Production of the former generally includes heating pretrimmed flat sheets of glass to their softening temperature, bending the heated sheets individually to a desired curvature between a pair of complementarily shaped press members, and then rapidly chilling the bent sheets in a controlled manner to a temperature below the annealing range to produce thermally induced tempering of the glass. In producing the latter, two sheets of flat glass are heated to their softening point and bent to a matching or nesting configuration, and then gradually cooled in a controlled manner to a temperature below their annealing range so that the cooled sheets are in annealed condition. The sheets are then laminated, one to either surface of a plastic interlayer as of polyvinyl butyral.

Traditionally, glass sheets for laminated units were bent in pairs on a gravity mold having a peripheral shaping rail, to insure that the pair would match or nest properly so as to permit lamination to a thin interlayer. Such gravity bending was time consuming and costly, and while the paired sheets would bend reasonably well in the longitudinal direction about their transverse axis, they did not consistently develop the desired cross bend. In other words, they did not develop the desired curvature in the transverse direction, about their longitudinal axis, for sheets with compound curvature. More recently, sheets for laminated units have been individually press bent to the desired curvature between a pair of complementarily shaped press members, and then paired for lamination to a plastic interlayer.

In order to achieve the desired curvature while minimizing the area of contact between the mold surfaces and the glass in press bending, the male mold member has conventionally been constructed with a solid or continuous shaping surface adapted to engage the entire surface of the sheet. The female mold member comprises an outline or ring-type shaping surface which engages only the marginal edge portions of the sheet. Such male molds were traditionally formed of metal or cast refractory material. More recently, in order to provide for adaptation of the male mold to production of parts having somewhat different curvatures and to correct distortions which may develop during prolonged use, so called adjustable continuous-surface molds have been developed. Such molds generally comprise a shaping element including a flexible, resilient body having affixed to its underside at spaced intervals a plurality of adjustable support members. By appropriately adjusting the support members, the precise desired curvature may thus be imparted to the shaping element.

It has been found in press bending certain parts that better results are achieved if slightly greater pressure is applied to the glass in certain regions by the male mold member as the male and female mold sections press the heated sheet therebetween. This is particularly true in the bending of sheets for lamination as automotive windshields wherein the inboard and outboard lights, that is, the light facing the interior of the vehicle and the light facing the exterior, respectively, assume slightly different radii of curvature as the two are laminated to the plastic interlayer. Likewise, in bending lights for electrically conducting windshields, which include bus bars applied to the surface at the end of a sheet to be bent and thus create a temperature differential between the end or pillar area and the central portion of the sheet, different pressures may be required to achieve the same approximate radius of curvature as with sheets not having the bus bar. While the aforementioned adjustable continuous surface molds represent a significant improvement over previous solid molds insofar as they permit modification of the surface contour to achieve desired results, they are not adapted for rapid cycling between alternative modes as found desirable, for example, in bending the two individual sheets of a pair to be laminated.

SUMMARY OF THE INVENTION

In accordance with the present invention there is Provided press bending apparatus including a solid male mold adapted to selectively apply varying pressures to different areas of sheets to achieve desired curvatures under different bending parameters. For example, different pressure patterns may be employed in bending the inboard and outboard lights of a pair of sheets to be laminated. The presence and positioning of bus bars for electrical heating circuits on one of the lights of a pair to be laminated will affect the heating pattern as the light passes through the heating zone prior to bending, so that different pressure patterns might advantageously be employed in bending the two lights of such a pair. To that end, the male mold comprises outer shaping rails supported in spaced relation upon a base plate. A flexible shaping member or pad disposed in the space between the shaping rails fills the space therebetween and provides a continuous shaping surface. The flexible shaping member is mounted in spaced relation upon a support plate movable relative to the base plate. The support plate is affixed to the base plate by means of eccentrically mounted rotatable shafts. Articulating apparatus is provided for cycling the shafts between alternate rotary positions to apply selected patterns of pressure in pressing sheets against the female press ring.

BRIEF DESCRIPTION OF THE DRAWINGS

In the drawings, wherein like numerals refer to like parts throughout:

FIG. 6 is an enlarged, fragmentary, elevational view, taken as from the right in FIG. 4, illustrating the outer shaft support;

FIG. 7 is an end view of an alternate form of eccentric shaft support;

FIG. 8 is an enlarged plan view, with the cover removed, of the operating mechanism or articulating apparatus of the invention;

FIG. 9 is a plan view illustrating the apparatus schematically.

DETAILED DESCRIPTION OF THE PREFERRED EMBODIMENT

Figure 1:
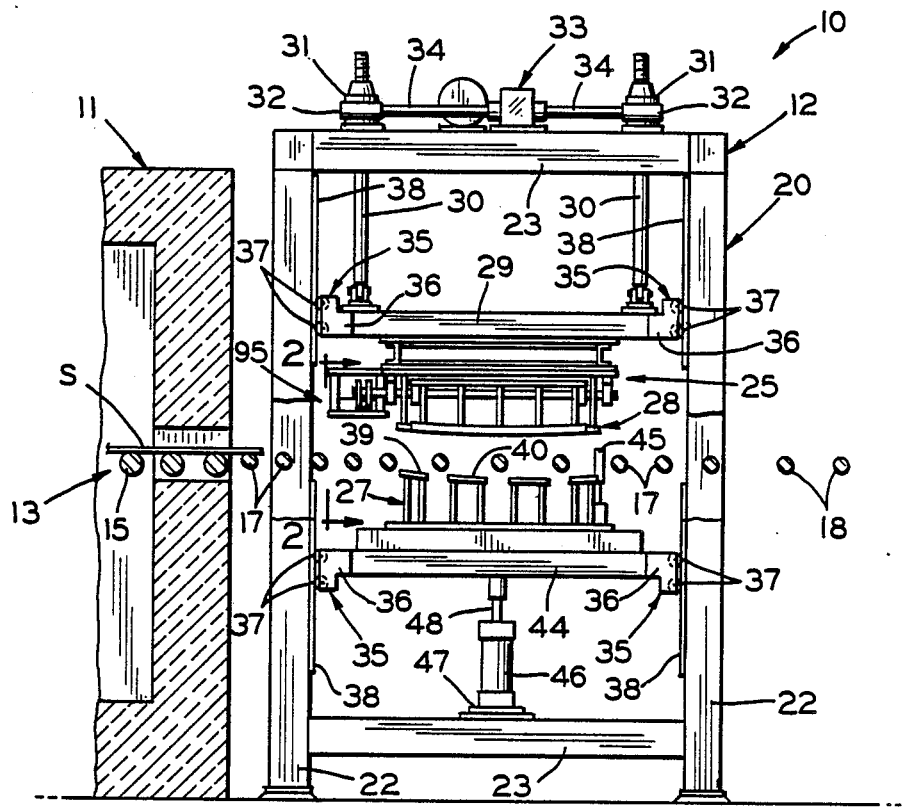
FIG. 1 is a side elevational view of a bending apparatus disposed adjacent a glass heating furnace and incorporating the novel male press bending mold of the invention.

Referring now to the drawings and in particular to FIG. 1, there is illustrated a glass sheet press bending facility, indicated generally at 10 and including a heating section 11 and a bending section 12. Glass sheets S to be bent are supported and conveyed through the facility one after another upon a roller conveyor system identified generally at 13. The conveyor more particularly includes a first section comprising rolls 15 for carrying the sheets through the heating section or furnace 11, a second section comprising rolls 17 for carrying the heated sheets into and through the bending section 12, and a third section comprising rolls 18 for receiving the bent sheets and conveying them through a subsequent thermal conditioning section (not shown).

The heating section 11 may be of a conventional construction as illustrated and described in commonly assigned copending application Ser. No. 07/312,120, filed Feb. 17, 1989, to which reference may be had for a comprehensive description thereof. The bending station 12 per se may likewise be of a general construction similar to that disclosed in the aforementioned application. More particularly, the press bending apparatus, as best shown in FIG. 1, comprises a skeletal framework 20, generally in the form of a rectangular parallelepiped, including upstanding corner posts 22 interconnected at their top and bottom by longitudinal beams 23 and transverse beams (not shown) to form a rigid, box-like structure. The rolls 17 of the press section are drivingly mounted upon the framework in a conventional manner (not shown). Mounted within the skeletal framework for reciprocating relative movement toward and away from each other are an upper male press member 25 and a lower female press member 27 having opposed complemental shaping surfaces conforming to the curvature to which the sheets are to be bent.

The male press member, as will be hereinafter more fully described, comprises a shaping element 28 carried upon a platen frame 29. The platen frame is preferably constructed so as to be vertically adjustable in order to accommodate glass parts bent to varying degrees of curvature between the male and female press members. The platen frame 29 is thus carried at each of its corners within the framework 20 at the lower ends of screw jack rods 30 which are threadedly received within rotatable collars 31 of screw jack bases 32 carried on a framework comprised by the longitudinal beams 23 and associated transverse beams atop the framework 20. A motorized drive unit 33, also carried atop the framework, includes drive shafts 34 adapted to rotatably drive the collars 31 in unison for retracting or extending the rods 30 to correspondingly raise or lower the platen frame 29 and the male shaping element 28 carried thereby.

A frame similar in construction to the platen frame 29 also carries the lower female press member 27 as will be hereinafter described. In order to insure that the frames move freely up and down along a precise vertical path within the framework 20, they are provided at each of their corners with stabilizing roller guide means 35. The guide means include brackets 36 affixed to the platen frames at their corners, each bracket carrying a pair of rollers 31 mounted perpendicularly to one another and adapted to rollingly engage track plates 38 affixed to adjacent angularly disposed faces of the associated corner posts 22. The platen frames are thus held firmly against lateral movement while being able to move freely up and down along a vertical path.

The lower or female press member 27, which may be of conventional construction and is normally located below the rolls 17 of the press section, is mounted for vertical reciprocal movement to lift a sheet S from the rolls and pres it against the upper male press member 25, and then deposit the bent sheet upon the rolls for advancement out of the press section and onto the rolls 18.

Figure 2:
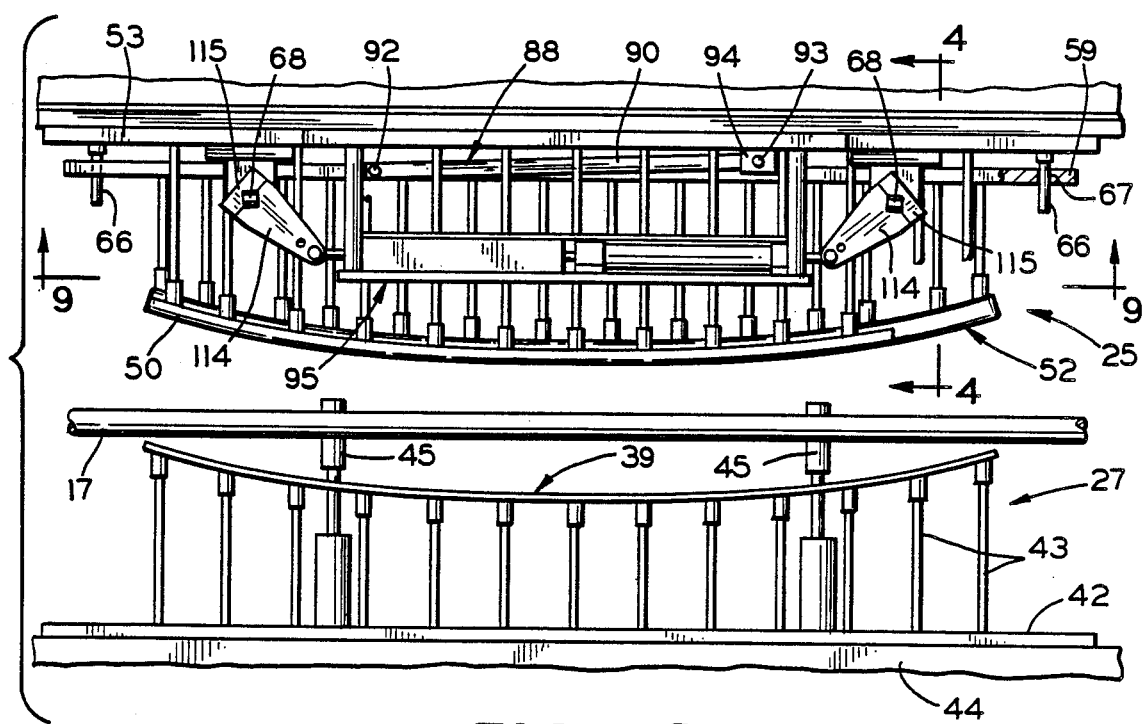
FIG. 2 is an enlarged fragmentary view taken substantially along line 2—2 of FIG. 1.

Various forms of rolls and press members have been utilized in order to permit the rolls to convey a sheet into position over the press member, and the press member to then lift the sheet from the rolls. As best illustrated in FIGS. 1 and 2, in one suitable arrangement wherein in order to permit it to pass upwardly between the rolls 17 for lifting the sheets therefrom, the female press member 27 is of conventional construction and comprises a shaping rail 39 of outline or ring-type construction conforming to the outline of the sheets S to be bent thereon, formed of a plurality of segments 40 spaced apart sufficiently to pass between adjacent ones of the rolls. The individual segments 40 are affixed, in spaced relation, to a base member 42 by connecting rods 43. The base member 42 is carried by a lower platen frame 44 having at its corners the roller guide means 34 for confining the platen frame and shaping rail thereon to vertical reciprocating movement within the framework 20. A spaced pair of vertically reciprocable stop means 45 is conventionally provided on the platen frame 44 between adjacent ones of the rolls 17 for precisely positioning incoming glass sheets S relative to the upper and lower press members 28 and 27, respectively.

A fluid actuated cylinder 46 is mounted beneath the lower platen frame 44 and carried by the beams 23. The cylinder includes a piston rod 48 affixed at its distal end to the platen frame 44 for reciprocally moving the lower or female press member 27 between its retracted position, whereat the shaping rail 38 is below the conveyor rolls 17, and its raised position whereat the ring segments are adapted to lift a heated sheet S from the conveyor rolls and press it against the male press member 25 between the complementary shaping surfaces of the male element 28 and the shaping rail 38, to bend it to a predetermined curvature. Upon completion of bending, the piston rod 48 is retracted to lower the platen frame 44, thereby retracting the shaping rail 38 beneath the conveyor rolls 17 and depositing the bent sheet thereon. The stop means 45 are, in the meantime, retracted so that the bent sheet is advanced out of the bending section by the rolls 17.

Figure 3:
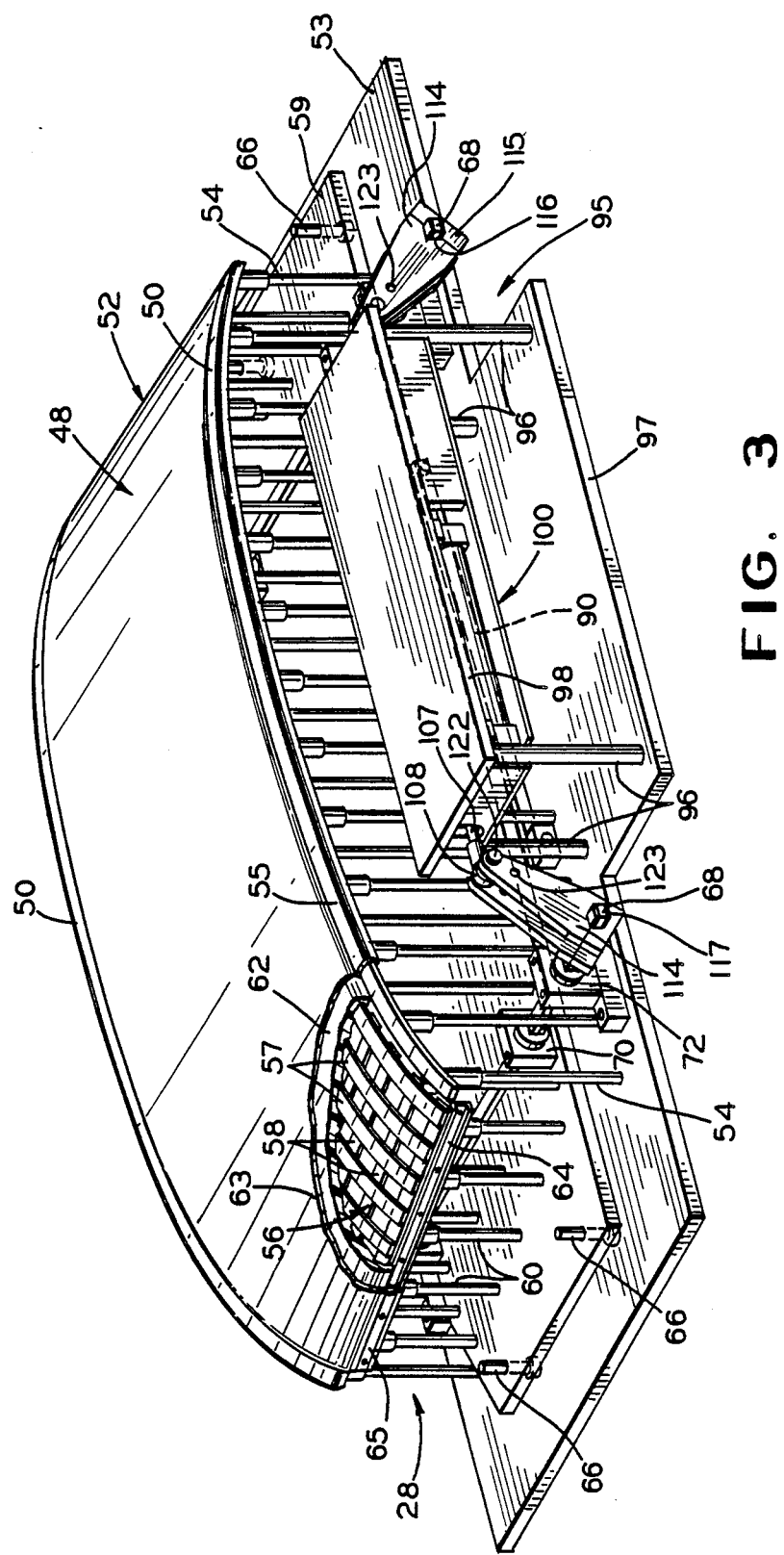
FIG. 3 is an enlarged perspective view of the male mold member, with parts broken away.
Figure 4:
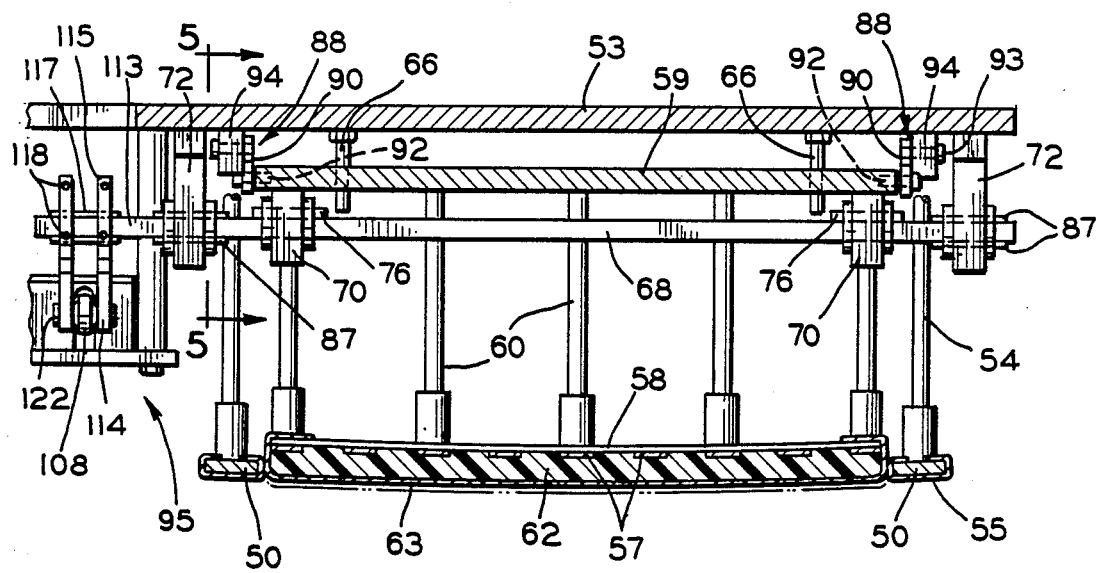
FIG. 4 is an enlarged side view, partially in section, taken substantially along line 4—4 of FIG. 2.

As best seen in FIGS. 3 and 4, the novel upper male press member 25 of the invention is of the so-called solid or continuous type. To that end, the male shaping element 28 includes a continuous glass contacting or pressing surface, identified generally at 48, having a configuration complementary to that of the lower female press member 27. More particularly, the surface 48 is defined by a pair of spaced longitudinally extending shaping rails 50 and a pad member 52 independent from the shaping rails and spanning the distance therebetween so as to create the substantially continuous surface.

The shaping rails 50 are affixed to an upper mold support plate 53 in spaced relation thereto as by connecting rods 54 in like manner to the mounting of the lower shaping rail 38 upon the base member 42. The support plate 53, in turn, is affixed to the platen frame 29 of the upper press member 25. The shaping rails 50 are preferably covered with a layer 55 as of a suitable non-abrasive, heat-resistant material such as a fiberglass cloth to present a smooth and somewhat resilient surface to the heat-softened glass.

The pad member 52 is of flexible construction so that it can be adjusted or distorted somewhat as will be hereinafter described to selectively vary the pressure applied to various areas as a sheet is pressed between the complemental shaping surfaces. To that end, as best seen in FIG. 3, the pad member may comprise a lattice framework or grid 56 of longitudinally and transversely extending metallic bands 57 and 58, respectively, supported in spaced relation upon a pad base plate 59 by a plurality of spaced support posts 60. By way of example, the grid may comprise relatively thin flexible steel bands, on the order of ⅛ inch (3.2 mm) thick by ¾ inch (19 mm) wide, welded or otherwise fused at their crossing points to form a solid grid. Alternatively, the grid may be of the type disclosed in U.S. Pat. No. 4,522,641 wherein the metal bands are loosely interwoven in an open, unbinding pattern. The individual support posts 60 are of such length as to impart to the supported latticework grid a surface contour corresponding generally to the curvature to be imparted to a sheet bent thereon.

The grid 55 is encapsulated in a body 62 as of silicone rubber which may, for example, be that sold under the trade name RTV, or other resilient material which will remain flexible and is capable of withstanding repeated exposure to a high temperature environment. The encapsulating body 62 provides at least a ⅛ inch (3.2 mm) cover over the bands, and its outer surface provides the design surface defining the configuration to which the interior portion of a sheet bent thereon is formed. In order to present a smooth and somewhat resilient surface to the heat-softened glass, a layer 63 of a suitable non-abrasive heat-resistant material similar to the layer 55 is stretched over the body 62. In order to secure the cloth layer 63, there is provided at each end of the lattice framework 56 an outwardly facing channel member 64. The marginal ends of the layer 63 are held within the channel by suitably secured removable clamping bars 65. As will be seen in FIGS. 3 and 4, the longitudinal side edges of the layer 63 are folded over the edges of the encapsulating body 62 and suitably secured behind the body so as to provide, with the layer 55, a substantially continuous mold surface, while permitting the pad member 52 to move up or down relative to the adjacent shaping rail 50.

A relatively small displacement of the pad member relative to the shaping rails, generally on the order of a few hundredths of an inch, is sufficient to produce the change in pressure or bending pattern desired in accordance with the invention. In order to provide for such movement, the pad base plate 59 is mounted in facing relationship to the base plate 53 for controlled movement toward and away therefrom. A plurality of guideposts 66 suitably affixed to the base plate 53 project through corresponding openings 67 in the pad base plate 59 for confining movement of the plate 59 to a direction normal to the base plate 53.

The pad member 52 is suspended from the base plate 53 in operative position, as best seem in FIGS. 2 and 4 and as shown schematically in FIG. 9, by means of a pair of rocker shafts 68 extending transversely of the press member and journalled in pillow blocks 70 affixed to the plate 59 and bearing stands 72 affixed to the base plate 53. The rocker shafts are eccentrically mounted within the pillow blocks 70 so that upon rotation of the shafts about their longitudinal axes, the pad base plate 59 is displaced relative to the base plate 53.

Figure 5:
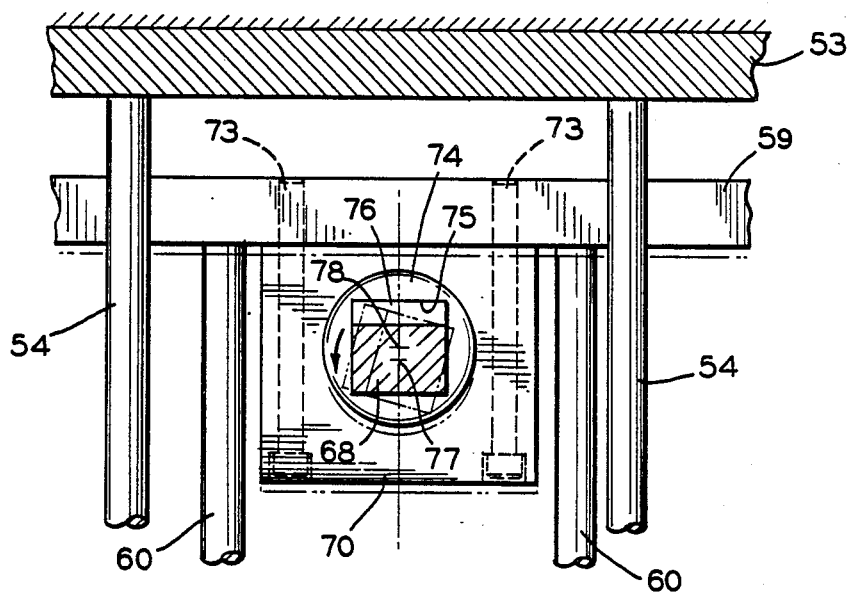
FIG. 5 is an enlarged fragmentary view taken substantially along line 5—5 of FIG. 4.

More particularly, as illustrated in FIG. 5 the pillow blocks 70 are affixed to the plate 59 as by threaded fasteners 73. Swivel inserts or bushings 74 rotatably mounted within the pillow blocks have square passages 75 extending axially therethrough. The rocker shafts 68 are of rectangular cross section and extend through the passages 75, with their longer dimension being substantially equal to that of a side of the square passages 75. A shim 76 is removably inserted in the passage between the rocker shaft and the wall of the swivel insert in the other dimension. As a result, as shown in FIG. 5 the longitudinal axis of the shaft 68, indicated by the intersection 77, is displaced from the axis of rotation of the swivel insert 74, indicated by the intersection 78. In other words, for a purpose to be described the rocker shaft is positioned off center within the swivel insert.

The bearing stands 72 include second pillow blocks 80 secured by fasteners 82 to spacer blocks 83, in turn affixed by fasteners 84 to the base plate 53. Swivel inserts or bushings 85 rotatably mounted within the pillow blocks have square passages 86 extending axially therethrough for receiving the rocker shaft 68. Removable shims 87 of equal thickness are provided on opposite sides of the shaft so that, in the illustrated embodiment, the shaft is concentrically mounted within the swivel insert.

As will be seen in FIG. 5, with the shims 76 and 87 arranged as in FIGS. 5 and 6, respectively, when the rocker shaft 68 is rotated in the direction of the arrow the off-center shaft moves from the solid to the broken line position. Due to the eccentric mounting of the shaft within the swivel inserts the inserts, and thus the pillow block 70 and base plate 59, move from their position shown in solid line to those shown in broken lines. This, in turn, causes the pad member 58 to be displaced as shown in FIG. 4 from the solid to the broken line position. It will be readily appreciated that the shims in the swivel insert 85, as well as those in the inserts 74, may be arranged in various combinations of thicknesses and positioned as deemed appropriate for providing the desired eccentricity or displacement at each swivel insert bushing as the rocker shaft is rotated.

In order to facilitate the limited movement of the pad base plate 58 toward and away from the base plate 53 as constrained by the guide pins 66 within the openings 67, there is provided along either side of the pad base plate a guide link, identified generally at 88. As best seen in FIGS. 2 and 4, the guide links comprise an elongated bar 90 pivotally affixed at one end as by a stud bolt 92 extending into the plate 59 along the side edge thereof. At their other end the bars are pivotally connected by a pin 93 to a bracket 44 affixed to the base plate 53.

The pad base plate 59 and associated pad member 52 are cycled between their operative positions by means of an articulating mechanism, identified generally at 95, forming a part of the upper male press member 25. More particularly, support posts 96 affixed to a lateral extension 97 of the base plate 53 carry at their distal ends a plate member 98 upon which is mounted an opposed linear actuating mechanism or dual rack and pinion assembly 100. Such an actuating mechanism is shown and described in U.S. Pat. No. 4,312,661 to Hagedorn et al., to which reference may be had for a detailed explanation of its construction and operation. Briefly, as best seen in FIG. 8 the mechanism includes a fluid actuating cylinder 102 provided with a piston (not shown) for operating a piston rod 103. The piston rod is operatively connected to a gear rack 104 which meshes with a pinion gear 105 journalled for rotation at a fixed position. A second gear rack 106 disposed in an opposed, spaced, parallel relation with the gear rack 104 also meshes with the pinion gear 105. The gear racks 104 and 106 are constrained to linear motion so that as the rack 104 is moved linearly in one direction by the piston rod 103, the rack 106 moves in the opposite direction by an equal amount. A connecting link 107 affixed to the rack 104 includes an eyelet 108 at its distal end, and a similar connecting link 110 connected to the rack 106 includes an eye 112 at the end of the articulating mechanism 95 opposite that of the eyelet 108.

The rocker shafts 68 include extensions 113 upon which pairs of spaced arms 114 are mounted by means of end caps 115. More specifically, the arms and end caps define at their juncture a square opening 116 within which the rocker-shaft is received, and shims 117 are provided for adapting the rectangular shaft to the square opening as with the pillow blocks 70 and bearing stands 72. The end caps are urged toward the arms and into clamping engagement with the shaft by threaded fasteners 118 (FIG. 4). At the opposite end the spaced arms are provided with openings 120 for connecting the arms, by means of pins 122, to the eyelets 108 and 112 of the associated connecting links 107 and 110. The arms may also be provided with an alternate opening or openings 123 for coupling the arms to the connecting links so as to vary the degree of rotation of the shafts 68.

There is illustrated in FIG. 7 an alternate embodiment of the invention wherein the rectangular rocker shaft is replaced by a rocker shaft 124 of circular cross section. In order to cause displacement of the pillow block 70 upon rotation of the shaft, the shaft is positioned off center and fixed within a swivel insert 125 carried by the pillow block. Thus as the shaft is rotated it, in turn, rotates the swivel insert to cause displacement of the pad base plate 59.

Reviewing briefly operation of the invention, when it is determined that different pressure may advantageously be applied to a particular region in press bending a glass sheet to a desired configuration as, for example, when one sheet of a matching pair to be subsequently laminated has a bus bar or bars along extending one side edge, the upper male press member 25 is set up so that upon cycling of the articulating mechanism 95 the pad member 52 will be displaced slightly relative to the associated shaping rail 50. Consequently, upon pressing of a sheet between the upper and lower press members, the upper member will apply more or less, bending pressure to the sheet in that area as desired. To that end, the shims 76 and 87 in the pillow blocks 70 and 80, as well as the shims 117 in the arms 114, may be positioned in each of the individual pillow blocks and arms as appropriate to produce the desired variation in bending pressure in specific areas. Likewise, the alternate openings 123 of the arms 114 may be utilized to selectively vary the degree of rotation of the rocker shafts 68. Thus, for bending one sheet of the pair the piston rod 103 of the cylinder 102 will remain retracted and the arms 114 will be in the position shown in FIG. 3, with the rocker shaft 68 in the position shown in solid lines in FIG. 5. For the other sheet of the pair the articulating mechanism will be operated to extend the piston rod, rotating the rocker shafts to the position shown in broken lines in FIG. 5 and consequently moving the pad member 52 from the position shown in solid lines in FIG. 4 as to the position shown therein in broken lines. Openings 67 are of such diameter, and the structure possesses sufficient flexibility, as to absorb stresses and accommodate such slight lateral or unbalanced motion as may occur due to particular placement of the individual shims 76, 87 or 117 and produce a desired pressure pattern by the pad member 52. The articulating mechanism will, of course, be alternately cycled between the two positions for press bending the two sheets of each matched pair of sheets to be laminated.

It is to be understood that the forms of the invention herewith shown and described are to be taken as illustrative embodiments only of the same, and that various changes in the shape, size and arrangement of the parts, as well as various procedural changes, may be resorted to without departing from the spirit of the invention.

What is claimed is:

1. Apparatus for press bending heated glass sheets comprising complemental male and female bending members mounted for reciprocating movement toward and away from each other for bending a heated sheet therebetween to a predetermined configuration, said male bending member comprising a pair of spaced shaping rails mounted in fixed relation to one another and defining longitudinal edges of said male member, a flexible pad member occupying the space between and mounted independent from said spaced shaping rails for limited movement between predetermined raised and lowered positions relative to said shaping rails, and articulating means connected to said pad member operable to selectively cycle said pad member between said raised and lowered positions whereby the pressure applied to succeeding heated sheets during pressing between said male and female members may be varied according to a predetermined pattern in selected areas.

2. Apparatus for press bending heated glass sheets as claimed in claim 1, wherein said female bending member comprises a peripheral ring-type shaping rail.

3. Apparatus for press bending heated glass sheets as claimed in claim 1, wherein said pad member comprises a lattice framework of longitudinal and transverse flexible bands encapsulated in a body of resilient material, and a layer of heat resistant fabric disposed over said body for engaging the surface of said sheets.

4. Apparatus for press bending heated glass sheets as claimed in claim 1, wherein said male bending member includes a first base plate, a plurality of connecting rods supporting said shaping rails in spaced relation from said first base plate, a pad base plate adjacent and facing said first base plate, a plurality of support posts affixed to said pad base plate and supporting said pad member in spaced relation thereto, and means mounting said pad base plate for movement toward and away from said first base plate to thereby move said pad member between said raised and lowered positions relative to said shaping rails.

5. Apparatus for press bending heated glass sheets comprising complemental male and female bending members mounted for reciprocating movement toward and away from each other for bending a heated sheet therebetween to a predetermined configuration, said male bending member comprising a pair of spaced shaping rails mounted in fixed relation to one another and defining longitudinal edges of said male member, a pad member mounted between and independent from said spaced shaping rails for limited movement between predetermined raised and lowered positions relative to said shaping rails, and articulating means connected to said pad member operable to selectively cycle said pad member between said raised and lowered positions whereby the pressure applied to succeeding heated sheets during pressing between said male and female members may be varied according to a predetermined pattern in selected areas, wherein said male bending member includes a first base plate, a plurality of connecting rods supporting said shaping rails in spaced relation from said first base plate, a pad base plate adjacent and facing said first base plate, a plurality of support posts affixed to said pad base plate and supporting said pad member in spaced relation thereto, and means mounting said pad base plate for movement toward and away from said first base plate to thereby move said pad member between said raised and lowered positions relative to said shaping rails, including at least one guide post affixed to said first base plate and extending generally normal thereto, said guide post being slidingly received within a corresponding opening in said pad base plate for guiding movement of said pad base plate toward and away from said first base plate.

6. Apparatus for press bending heated glass sheets comprising complemental male and female bending members mounted for reciprocating movement toward and away from each other for bending a heated sheet therebetween to a predetermined configuration, said male bending member comprising a pair of spaced shaping rails mounted in fixed relation to one another and defining longitudinal edges of said male member, a pad member mounted between and independent from said spaced shaping rails for limited movement between predetermined raised and lowered positions relative to said shaping rails, and articulating means connected to said pad member operable to selectively cycle said pad member between said raised and lowered positions whereby the pressure applied to succeeding heated sheets during pressing between said male and female members may be varied according to a predetermined pattern in selected areas, wherein said male bending member includes a first base plate, a plurality of connecting rods supporting said shaping rails in spaced relation from said first base plate, a pad base plate adjacent and facing said first base plate, a plurality of support posts affixed to said pad base plate and supporting said pad member in spaced relation thereto, and means mounting said base plate for movement toward and away from said first base plate to thereby move said pad member between said raised and lowered positions relative to said shaping rails, wherein said means mounting said pad base plate includes an elongated rocker shaft pivotally mounted on said first base plate for rotary movement about an axis extending longitudinally thereof, pillow block means affixed to said pad base plate, swivel means mounting said rocker shaft for rotary movement within said pillow block means, and means for selectively rotating said rocker shaft between predetermined angular positions.

7. Apparatus for press bending heated glass sheets as claimed in claim 6, wherein said means mounting said pad base plate comprises a spaced pair of said elongated rocker shafts.

8. Apparatus for press bending heated glass sheets as claimed in claim 6, wherein said rocker shaft extends through an opening in said swivel means and is fixed relative to said swivel means for rotation therewith, including shim means removably positioned within said opening between said shaft and said swivel means whereby said shaft is adjustably eccentrically positioned within said swivel means.

9. Apparatus for press bending heated glass sheets as claimed in claim 8 wherein said opening is square and said rocker shaft is of rectangular cross-section, said shim means being positioned along a selected one of the longer sidewalls of said shaft for imparting a predetermined eccentricity to said shaft as it is turned.

10. Apparatus for press bending heated glass sheets as claimed in claim 6, including a bearing stand affixed to said first base plate for pivotally mounting said rocker shaft, and a swivel insert within said bearing stand through which said shaft extends.

11. Apparatus for press bending heated glass sheets as claimed in claim 10, including means for adjustably positioning said shaft within said swivel of said bearing stand for selectively varying the position of the longitudinal axis of said shaft relative to the axis of rotation of said swivel means.

12. Apparatus for press bending heated glass sheets as claimed in claim 6, including arm means affixed to said rocker shaft, and actuating means connected to said arm means for reciprocably moving said arm means between alternate positions to rotate said shaft between selected angular positions.

13. Apparatus for press bending heated glass sheets as claimed in claim 12, wherein said means mounting said pad base plate includes a spaced pair of said elongated rocker shafts, said actuating means comprising rack and pinion means connected to said arm means for simultaneously rotating said rocker shafts.

14. Apparatus for press bending heated glass sheets as claimed in claim 5, wherein said means mounting said pad base plate includes a spaced pair of elongated rocker shafts rotatably mounted adjacent each of their ends on said first base plate for rotational movement about a longitudinally extending axis, a pair of pillow block means affixed to said pad base plate at spaced locations along each said rocker shaft, swivel means mounting said rocker shafts for rotational movement within said pillow block means, at least one of said rocker shafts being eccentrically mounted within at least one of said swivel means, an arm affixed to each said rocker shaft, and means connected to said arms for pivoting said arms back and forth to rotate said rocker shafts between alternate positions and thereby to vary the pressure applied to said heated sheet in selected areas.

15. Apparatus for press bending heated glass sheets as claimed in claim 14, wherein said means for pivoting said arms comprises rack and pinion means connected to a reciprocable piston rod whereby said arms are pivoted in opposed directions upon extension and retraction of said piston rod.

16. Apparatus for press bending heated glass sheets as claimed in claim 15, including means mounting at least one end of at least one of said rocker shafts on said first base plate for eccentric rotational movement.

* * * * *